(12) United States Patent
Klein et al.

(10) Patent No.: US 10,824,681 B2
(45) Date of Patent: Nov. 3, 2020

(54) ENTERPRISE RESOURCE TEXTUAL ANALYSIS

(71) Applicant: SAP SE, Walldorf (DE)

(72) Inventors: Udo Klein, Eggenstein-Leopoldshafen (DE); Susan Marie Thomas, Karlsruhe (DE)

(73) Assignee: SAP SE, Walldorf (DE)

( * ) Notice: Subject to any disclaimer, the term of this patent is extended or adjusted under 35 U.S.C. 154(b) by 375 days.

(21) Appl. No.: 15/357,357

(22) Filed: Nov. 21, 2016

(65) Prior Publication Data

US 2018/0144032 A1 May 24, 2018

(51) Int. Cl.
*G06F 16/00* (2019.01)
*G06F 16/93* (2019.01)
*G06Q 40/00* (2012.01)
*G06Q 30/00* (2012.01)

(52) U.S. Cl.
CPC ............. *G06F 16/93* (2019.01); *G06Q 30/00* (2013.01); *G06Q 40/00* (2013.01)

(58) Field of Classification Search
CPC ... G06F 17/30011; G06F 16/93; G06Q 30/00; G06Q 40/00
USPC .................... 707/E17.044, E17.108, 999.003
See application file for complete search history.

(56) References Cited

U.S. PATENT DOCUMENTS

| 5,299,122 | A  | * | 3/1994  | Wang ................. | G06F 17/2205 |
| 7,328,209 | B2 | * | 2/2008  | Das ................... | G06F 16/2448 |
| 7,945,604 | B2 | * | 5/2011  | Wang ................. | G06F 17/30595 |
|           |    |   |         |                       | 707/803 |
| 8,909,664 | B2 | * | 12/2014 | Hopkins ............ | G06F 17/30209 |
|           |    |   |         |                       | 707/763 |
| 9,400,835 | B2 | * | 7/2016  | Setlur ................ | G06F 17/30554 |
| 2002/0184401 | A1 | * | 12/2002 | Kadel, Jr. .............. | G06F 8/76 |
|           |    |   |         |                       | 719/315 |
| 2004/0260702 | A1 | * | 12/2004 | Cragun ................ | G06F 16/954 |
| 2005/0091231 | A1 | * | 4/2005 | Pal ...................... | G06F 16/84 |
| 2005/0138052 | A1 | * | 6/2005 | Zhou .................... | G06F 16/284 |
| 2006/0036592 | A1 | * | 2/2006 | Das ...................... | G06F 16/2448 |
| 2007/0094230 | A1 | * | 4/2007 | Subramaniam ..... | G06F 16/2457 |
|           |    |   |         |                       | 706/62 |
| 2007/0129977 | A1 | * | 6/2007 | Forney ................ | G06F 17/30873 |
|           |    |   |         |                       | 715/745 |
| 2007/0192306 | A1 | * | 8/2007 | Papakonstantinou .......... | |
|           |    |   |         |                       | G06F 17/30864 |
| 2008/0255865 | A1 | * | 10/2008 | Ritter .................... | G06Q 10/10 |
|           |    |   |         |                       | 705/1.1 |
| 2010/0010968 | A1 | * | 1/2010 | Redlich .............. | G06F 17/30672 |
|           |    |   |         |                       | 707/E17.014 |
| 2010/0257198 | A1 | * | 10/2010 | Cohen ................ | G06F 16/24564 |
|           |    |   |         |                       | 707/770 |

(Continued)

*Primary Examiner* — Shiow-Jy Fan
(74) *Attorney, Agent, or Firm* — Sterne, Kessler, Goldstein & Fox P.L.L.C.

(57) ABSTRACT

Disclosed herein are system, method, and computer program product embodiments for providing enterprise resource textual analysis. An embodiment operates by receiving a request to search a document management system for a keyword. One or more relevant documents of the document management system associated with the keyword are identified. The keyword is compared to a data dictionary corresponding to an enterprise system associated with the document management system. Contextual search results including the one or more relevant documents and a relationship between the keyword and data of the enterprise system are provided.

18 Claims, 4 Drawing Sheets

(56) References Cited

U.S. PATENT DOCUMENTS

| | | | | |
|---|---|---|---|---|
| 2011/0161333 | A1* | 6/2011 | Langseth | G06F 17/30563 707/755 |
| 2011/0161445 | A1* | 6/2011 | Nelke | H04L 51/04 709/206 |
| 2012/0203584 | A1* | 8/2012 | Mishor | G06Q 30/02 705/7.11 |
| 2012/0265744 | A1* | 10/2012 | Berkowitz | G06Q 30/06 707/705 |
| 2013/0031126 | A1* | 1/2013 | Setlur | G06F 16/248 707/769 |
| 2014/0046976 | A1* | 2/2014 | Zhang | G06F 17/30483 707/772 |
| 2015/0161242 | A1* | 6/2015 | Visotski | G06F 16/338 707/730 |
| 2017/0006135 | A1* | 1/2017 | Siebel | H04L 67/02 |

* cited by examiner

ENTERPRISE RESOURCE TEXTUAL ANALYSIS

BACKGROUND

Digital forensics often requires an investigator to parse through millions of documents of a company to try and find proof of a crime or other misdoing (or another event or activity of interest). Manually sorting through these millions of documents however is extremely time consuming. As such, investigators often rely on generic text analysis and searching tools which may be used to identify a subset of relevant documents that include a search term. However, the results could number in the millions, and it is the responsibility of the investigator to try and determine how or whether these documents are relevant to the investigation. This process is not only time consuming, but fraught with the possibility of human error.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for enterprise resource textual analysis.

Figure 1:
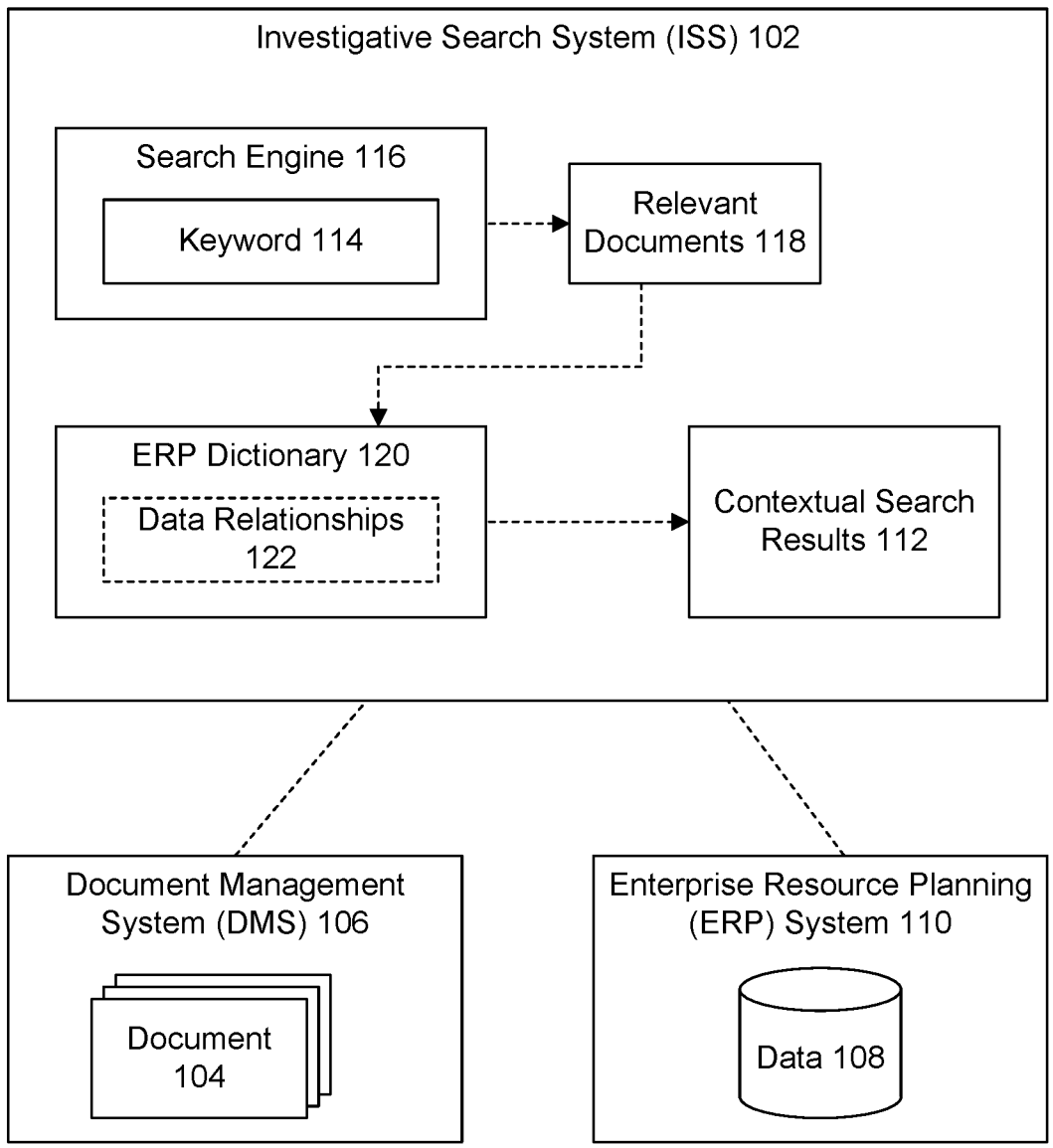
FIG. 1 is a block diagram of a system for providing enterprise resource textual analysis, according to an example embodiment.

FIG. 1 is a block diagram of a system for providing enterprise resource textual analysis, according to an example embodiment. An investigative search system (ISS) 102 may provide enterprise resource textual analysis. For example, ISS 102 may provide enhanced searching and analysis of one or more documents 104 of a document management system (DMS) 106, by providing contextual analysis on relevant documents 118 based on the data 108 of an enterprise resource planning (ERP) system 110.

In an example embodiment, a forensics investigator may be investigating a particular company to determine whether or not an illegal or otherwise unauthorized transaction (or another activity or event of interest) may have taken place. The investigator may have access to the company's DMS 106, which may include the company's e-mails and/or other electronic documents 104. The investigator may want to find e-mails which may be relevant to the investigation. Using a standard dictionary, the investigator may look for a particular search term in the e-mails, and the DMS 106 may return a document or documents that include the search term. The investigator would then have to analyze the returned documents to determine how the searched term is used and whether or not it is relevant to the company or the investigation.

ISS 102 however improves and enhances search results by leveraging data 108 from ERP 110 to provide contextual search results 112. For example, the investigator may enter or provide a keyword 114 or multi-word phrase, such as "apple" which the investigator believes to be relevant to the investigation. A search engine 116 may search documents 104 of DMS 106 for the keyword 114 "apple" and return one or more relevant documents 118. Relevant documents 118 may be a subset of documents 104 of DMS 106.

However, rather than simply returning relevant documents 118 to the investigator, ISS 102 may continue to process and enhance or contextualize the search results using an ERP dictionary 120 that leverages the data 108 of ERP system 110. Then, for example, the relevant documents 118 may be returned with additional context relevant to the keyword(s) 114 and/or text of relevant documents 118.

For example, the term "apple" may have different meanings in different contexts. For example, apple may reference the fruit, a company name, an employee name, the name of an internal document or project, a business partner name, a client name, a supplier name, an ingredient name, etc. Rather than relying on an investigator to attempt to manually sort through the results (which could number in the thousands or even millions of documents), ISS 102 may provide enhanced or contextualized search results 112 by determining data relationships 122 between the keyword(s) 114, text of relevant documents 118, and a company's own ERP system 110, including data 108 therein.

Data relationships 122 may indicate a context as to how a particular keyword 114 is used with regard to a particular company or enterprise, as determined from ERP system 110. For example, ERP system 110 may include a number of business objects, such as account information, employee information, client information, supplier information, etc. These business objects may have data 108 corresponding to actually accounts, employees, clients, suppliers, etc. of a company or organization.

In an embodiment, data 108 may include master data, transactional data, or aggregate data. Master data may include data about different business objects in ERP system 110, such as clients, business partners, products, real estate, etc. Transactional data may include data regarding transactions performed by or with regard to the business objects, such as the transfer of property, hiring of an employee, payments to suppliers, payments from customers, or other transactions (including both financial and non-financial transactions). Aggregate data may include data derived from master data and/or transactional data. Example of aggregate data may include average, standard deviation, and range of amounts of orders per product, per customer and/or per salesperson This information may be accessible to or otherwise available via ERP dictionary 120. ISS 102 may leverage ERP dictionary 120 to determine data relationships 122 that are particular to keyword 114 and/or other text of relevant documents 118. For example, ISS 102 may determine that "apple" is actually an employee name (as indicated by a business object of ERP system 110), and that there are actually two employees with the surname of "Apple" (as determined from data 108). Contextual search results 112 may then include not only the relevant documents 118 with the term "apple," but also an indication that "apple" corresponds to two possible employee names of a particular company or organization that may be associated with the investigation or search.

In an embodiment, contextual search results 112 may include additional, potentially relevant, information about the employees as may be determined from data 108 of ERP system 110. For example, contextual search results 112 may include or reference (e.g. via a link) information about the two employees from data 108 such as employee ID, length of employment, role in the company, employee transactions, education, contact information, etc. This information may be provided or otherwise made available by ISS 102 and may be used to further the investigation. This may not only save time, but also processing power that may otherwise be required to perform a second subsequent search on ERP system 110.

Further, the investigator may use the contextual search results 112 to perform a subsequent search. For example, from the returned information of contextual search results 112, the investigator may determine which of the two employees with the surname "Apple" is actually relevant to the investigation, and may further refine relevant documents 118 or contextual search results 112 to include on those documents with references to the relevant employee, or otherwise exclude documents that are referencing the irrelevant employee.

In an embodiment, ISS 102 may provide this refinement option based on ERP dictionary 120 prior to search engine 116 returning relevant documents 118. For example, upon receiving a search request for "apple," ISS 102 may prompt user that "apple" is related to two different company employees. ISS 102 may then ask the investigator for which employee(s) documents 118 are to be returned. Or, for example, in an embodiment, contextual search results 112 may return relevant documents that are categorized based on whether the relevant documents 118 are associated with the first employee, the second employee, both employees, neither employee, or may include ambiguous use.

Document management system (DMS) 106 may be a system used to track, manage and store documents 104, which may include both internally generated and used documents of a company, and documents communicated to/from outside sources. DMS 106 may include a wide range of documents, including but not limited to e-mail documents, word processing documents, pictures, scanned images, spreadsheets, computer programs, applications, etc.

ERP system 110 may include business management software used to collect, store, manage data from different business activities of a company, enterprise, or other organization. Example activities may include financial transactions, such as purchase orders and invoices, human resource information, inventory management, marketing and sales information, etc. Any activities performed by one or more employees of an organization, performed on behalf of the organization, may be tracked by ERP 110, and be stored as data 108.

Search engine 116 may include a text-based search engine that searches documents 104 based on one or more keywords or phrases 114 selected or otherwise provided by a user or other system. Search engine 116 may search DMS 106 and return relevant documents 118 that include or are otherwise deem associated with keyword(s) 114. Relevant documents 118 may include a subset of one or more documents 104 that have been selected by search engine 116 as being associated with one or more keywords 114.

ERP dictionary 120 may be a metadata repository that includes information about or metadata about data 108. ERP dictionary 120 may provide an ontology of the business objects of ERP system 110, which may be developed by implementing different mapping rules for mapping the structure of ERP system 110 to a new or different structure for ERP dictionary 120.

ERP dictionary 120 may include data relationships 122 that indicate a category of information in ERP system 110 or how that information is related to other data 108 of ERP system 110. In an embodiment, this information may be determined from different classes or business objects of ERP system 110. For example, data relationships 122 may provide the indication that "Apple" is a surname of at least one employee. Data relationships 122 may further provide the first name of the employees, and other employee information from ERP system 110. Such information may be retrieved, for example, from human resource data 108 or financial transaction data 108 (as performed relative to the respective employees). Example financial transaction data 108 may include payments made to the employees, or payments made or authorized by the employee on behalf of the company.

ISS 102 may combine relevant documents 118 and ERP dictionary 120 to provide or return contextual search results 112. Contextual search results 112 may take a number of different formats. For example, contextual search results 112 may include annotated versions of relevant documents 118 (the annotations indicating the determined data relationships 122). In an embodiment, contextual search results 112 may include links to data 108 that may be relevant to keyword 114. Or, for example, contextual search results 112 may include relevant documents 118 categorized based on data relationships 122. As noted above, contextual search results 112 may provide the basis for a new or subsequent search by search engine 116. The subsequent search may be performed on contextual search results 112 based on a selection of which employee is relevant to the investigation.

Figure 2:
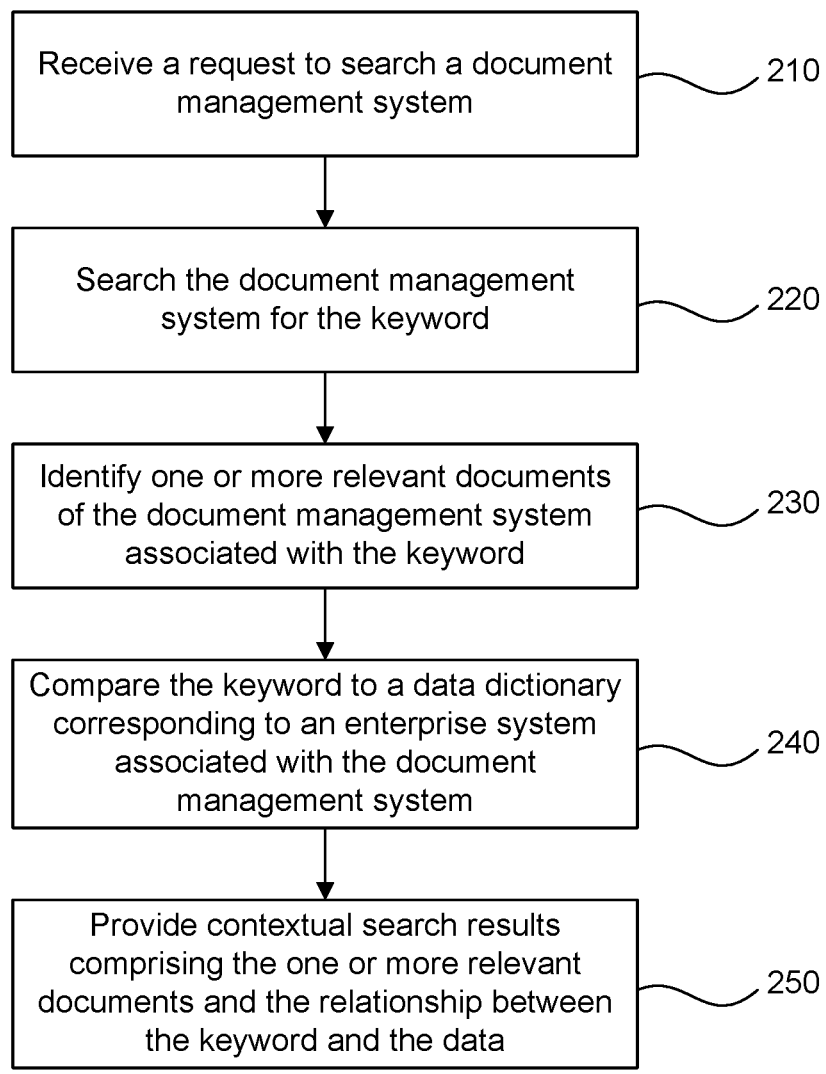
FIG. 2 is a flowchart illustrating a process for providing enterprise resource textual analysis, according to an embodiment.

FIG. 2 is a flowchart illustrating a process for providing enterprise resource textual analysis, according to an embodiment. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

At 210, a request to search a document management system is received. For example, search engine 116 may receive one or more phrases or keywords 114 from an investigator, user, or other system.

At 220, the document management system is searched for the keyword. For example, search engine 116 may search documents 104 of DMS 106 for relevant documents 118 that include one or more of the keywords 114.

At 230, one or more relevant documents of the document management system associated with the keyword are identified based on the searching. For example, search engine 116 may determine or return relevant documents 118 to ISS 102. In an embodiment, search engine 116 may return or identify relevant documents 118 that do not include the exact phrases or keywords 114 provided, but include other words or phrases that are deemed to be related to keywords 114. For example, keyword 114 may include "apple," but a subset of relevant documents 118 may include "fruit," "apples," or "cider." Search engine 116 may provide a link to, copy of, or memory address of relevant documents 118 to ISS 102.

At 240, the keyword is compared to a data dictionary corresponding to an enterprise system associated with the document management system. For example, ISS 102 may compare keywords 114 to ERP dictionary 120. ISS 102 may determine data relationships between keyword 114, text of relevant documents 110, and data 108 based on ERP dictionary 120. Data relationships 122 may categorize keywords 114 or text of relevant documents 118, or may otherwise determine which data 108 that may be relevant to the provided keywords 114 or text.

At 250, contextual search results comprising the one or more relevant documents and the relationship between the keyword and the data are provided. For example, contextual search results 112 may include relevant documents 118 that have been annotated with data relationships 122. As an example, relevant document 118 may indicate that person X missed a phone call from telephone number 123-456-7890. ISS 102 may compare the telephone number to data 108 of ERP system 110, and determine who the telephone number corresponds to and their relationship to the company or person X. For example, contextual search results 112 may provide the relevant e-mail 118, but also may include an indication that the telephone number corresponds to Company A that is a client of Person X.

Figure 3:
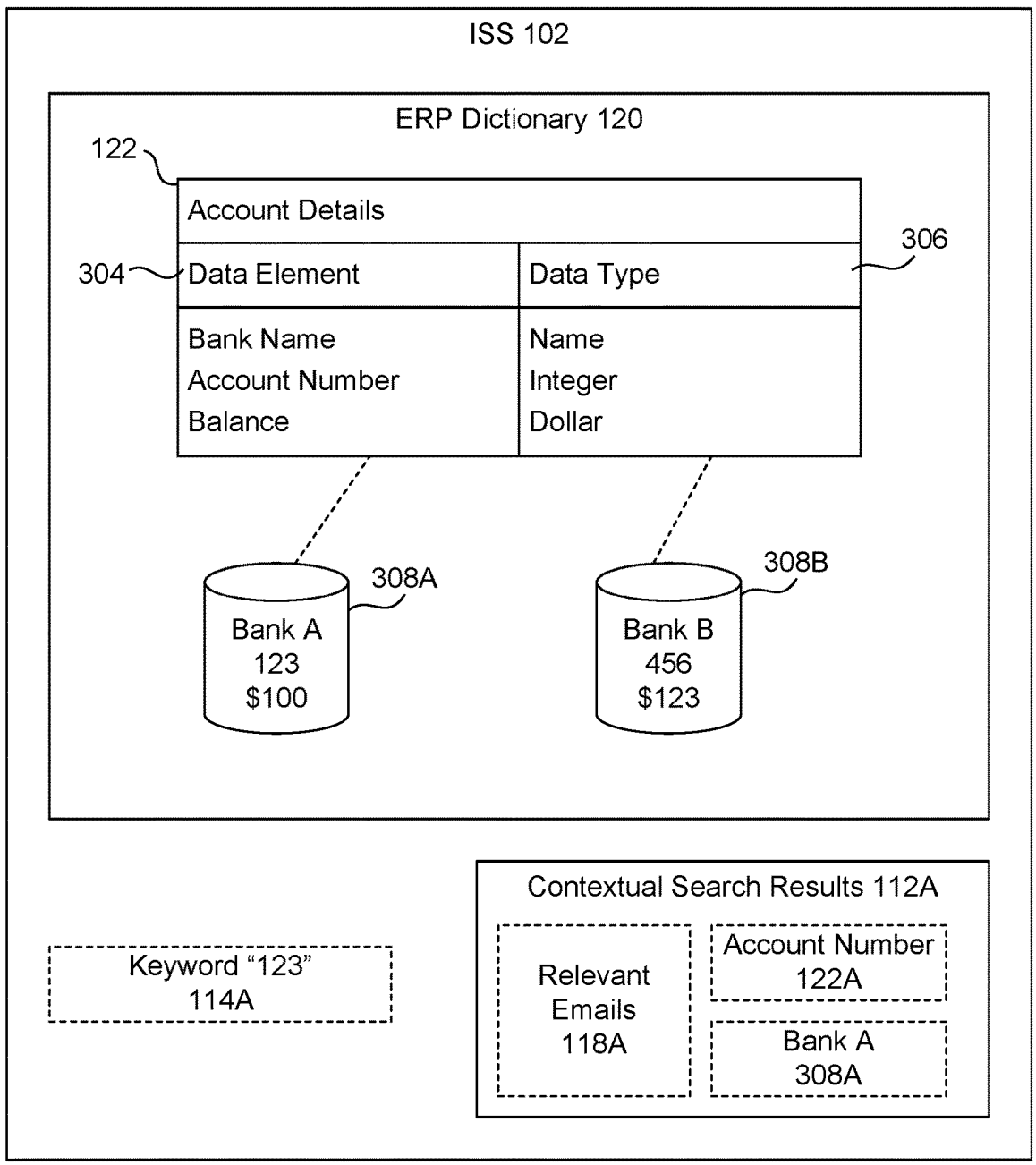
FIG. 3 is a block diagram of a system for providing enterprise resource textual analysis, according to another example embodiment.

FIG. 3 is a block diagram providing enterprise resource textual analysis, according to another example embodiment. ISS 102 may receive keyword 114 "123." A search engine 116 may search a DMS 106 and return e-mails that include the phrase "113" as relevant e-mails 118.

ISS 102 may then compare the relevant e-mails 118 and/or keyword 114 against ERP dictionary 120. Account details 122 is an example of a data relationship or business object determined from ERP system 110. As shown, account details 122 may provide the details of account information stored in data 108. In the example shown, account details 122 include both a data element 304 column and a corresponding data type 306 column. The data element 304 column may include the name or category of various data elements included in an account object, such as bank name, account number, and balance. The data type 306 indicates what type of data populates each data element, such as a Name, Integer, and Dollar data type. The examples shown are exemplary only.

As shown, data 108 of an ERP system 110 may include two data objects, or instantiations of account details 122 object, data 308A and data 308B. Based on its comparison of keyword 114 with ERP dictionary 120, ISS 102 may provide contextual search results 112. The contextual search results 112 may include information from data relationship 122 and/or data 108. For example, relevant e-mails 118 may be returned with an indication, that "123" is actually an account number data element, and that 123 specifically corresponds to Bank A. Additionally, contextual search results 112 may include an indication that the balance is $100, or that Bank B does not include an account number of "123."

Figure 4:
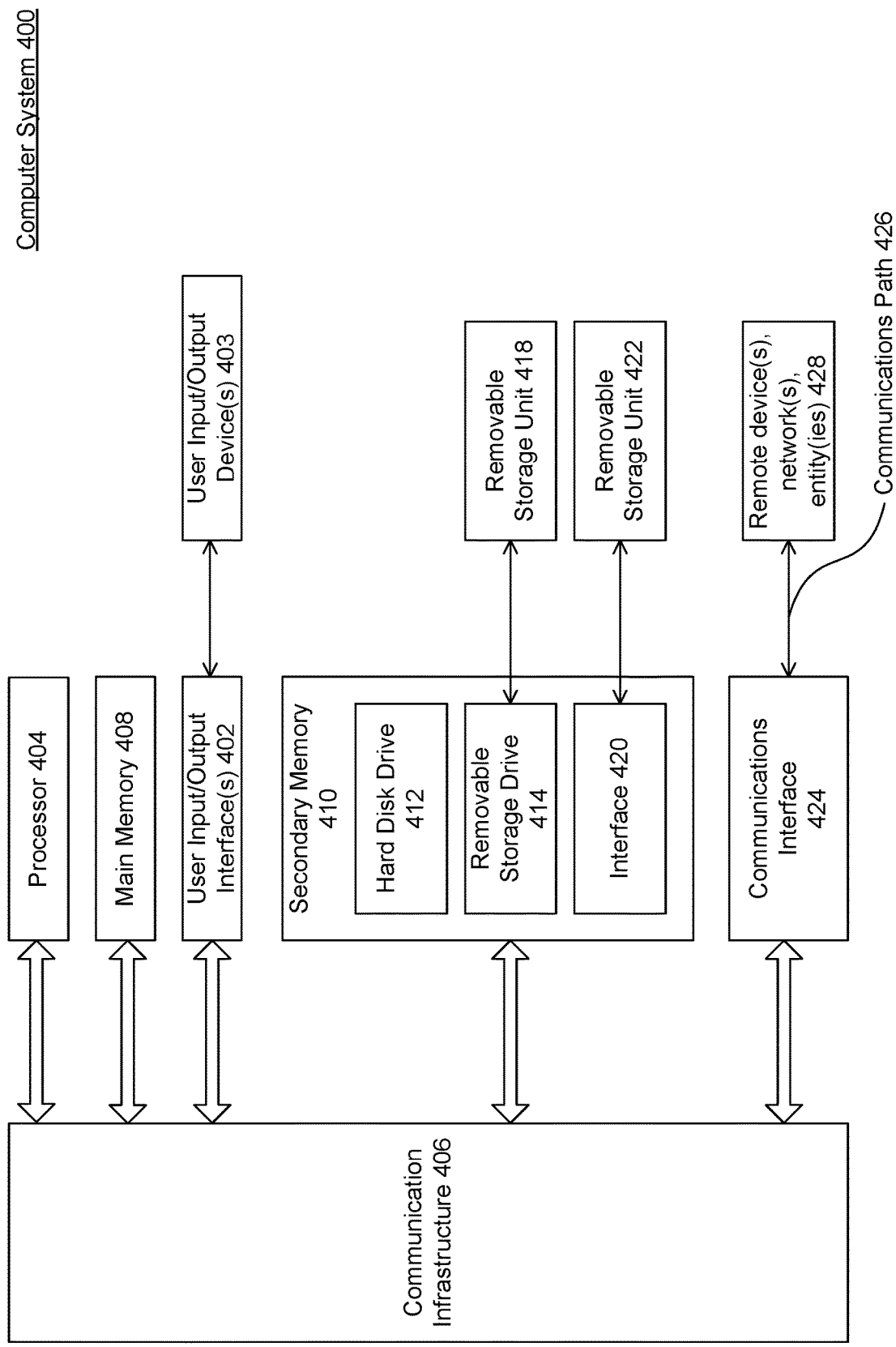
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   receiving, by a processor, a request to search a document management system, wherein the request is associated with a keyword;
   searching the document management system for the keyword;
   identifying one or more relevant documents of the document management system associated with the keyword based on the searching;
   identifying, by the processor, a plurality of relationships between the keyword and the one or more relevant documents of the document management system based on a comparison of the keyword to a data dictionary corresponding to data of an enterprise system associated with the document management system, wherein each relationship is displayed and indicates a category of information corresponding to a context in which the keyword is used in the one or more relevant documents of the document management system;
   annotating, by the processor, the one or more relevant documents of the document management system to include a data type of a column of the enterprise system where the keyword was found based on the comparing;
   providing contextual search results comprising the one or more relevant documents of the document management system including the annotation indicating the data type of the column of the enterprise system;
   receiving a request to search the contextual search results based on a selection of a first one of the plurality of relationships between the keyword and the data of the enterprise system; and
   updating the contextual results based on the selection of the first relationship, wherein the updated contextual results exclude the one or more relevant documents corresponding to any relationship other than the selected first relationship.

2. The method of claim 1, wherein the document management system comprises a plurality of e-mails stored therein.

3. The method of claim 2, wherein the emails are associated with e-mails sent and received by employees of a company, wherein the enterprise system is associated with a plurality of transactions performed by one or more of the employees.

4. The method of claim 1, wherein the enterprise system comprises transaction data corresponding to the one or more categories of information.

5. The method of claim 1, wherein the comparing comprises:
   comparing text of the relevant documents to the data dictionary; and
   determining a relationship between the text and the data of the enterprise system.

6. The method of claim 1, wherein the providing comprises providing the data from the enterprise system in association with the relevant documents.

7. A system, comprising:
   a non-transitory memory; and
   at least one processor communicatively coupled to the memory and configured to perform operations comprising:
   receiving a request to search a document management system, wherein the request is associated with a keyword;
   searching the document management system for the keyword;

identifying one or more relevant documents of the document management system associated with the keyword based on the searching;
identifying, by the processor, a plurality of relationships between the keyword and the one or more relevant documents of the document management system based on a comparison of the keyword to a data dictionary corresponding to data of an enterprise system associated with the document management system, wherein each relationship is displayed and indicates a category of information corresponding to a context in which the keyword is used in the one or more relevant documents of the document management system;
annotating, by the processor, the one or more relevant documents of the document management system to include a data type of a column of the enterprise system where the keyword was found based on the comparing;
providing contextual search results comprising the one or more relevant documents of the document management system including the annotation indicating the data type of the column of the enterprise system;
receiving a request to search the contextual search results based on a selection of a first one of the plurality of relationships between the keyword and the data of the enterprise system; and
updating the contextual results based on the selection of the first relationship, wherein the updated contextual results exclude the one or more relevant documents corresponding to any relationship other than the selected first relationship.

8. The system of claim 7, wherein the document management system comprises a plurality of e-mails stored therein.

9. The system of claim 8, wherein the emails are associated with e-mails sent and received by employees of a company, wherein the enterprise system is associated with a plurality of transactions performed by one or more of the employees.

10. The system of claim 7, wherein the enterprise system comprises transaction data corresponding to the one or more categories of information.

11. The system of claim 7, wherein the comparing operation further comprises:
comparing text of the relevant documents to the data dictionary; and
determining a relationship between the text and the data of the enterprise system.

12. The system of claim 7, wherein the contextual search results comprise at least two relationships between the keyword and the data.

13. The system of claim 7, wherein the providing operation comprises providing the data from the enterprise system in association with the relevant documents.

14. A non-transitory computer-readable device having instructions stored thereon that, when executed by at least one computing device, causes the at least one computing device to perform operations comprising:
receiving a request to search a document management system, wherein the request is associated with a keyword;
searching the document management system for the keyword;
identifying one or more relevant documents of the document management system associated with the keyword based on the searching;
identifying, by the processor, a plurality of relationships between the keyword and the one or more relevant documents of the document management system based on a comparison of the keyword to a data dictionary corresponding to data of an enterprise system associated with the document management system, wherein each relationship is displayed and indicates a category of information corresponding to a context in which the keyword is used in the one or more relevant documents of the document management system;
annotating, by the processor, the one or more relevant documents of the document management system to include a data type of a column of the enterprise system where the keyword was found based on the comparing;
providing contextual search results comprising the one or more relevant documents of the document management system including the annotation indicating the data type of the column of the enterprise system;
receiving a request to search the contextual search results based on a selection of a first one of the plurality of relationships between the keyword and the data of the enterprise system; and
updating the contextual results based on the selection of the first relationship, wherein the updated contextual results exclude the one or more relevant documents corresponding to any relationship other than the selected first relationship.

15. The device of claim 14, wherein the document management system comprises a plurality of e-mails stored therein, and wherein the emails are associated with e-mails sent and received by employees of a company, wherein the enterprise system is associated with a plurality of transactions performed by one or more of the employees.

16. The method of claim 1, wherein the comparing comprises:
determining that the enterprise system comprises a plurality of business objects that categorize data of the enterprise system; and
determining the relationship based on an overlap of data from one of the relevant documents and data of a particular one of the business objects.

17. The method of claim 1, wherein the annotating further comprises:
annotating, by the processor, the one or more relevant documents to include a data value corresponding to the data type of the column.

18. The method of claim 1, further comprising:
searching the contextual results based on the selection of the first relationship to identify a subsequent set of contextual search results, wherein at least one or more identified documents are excluded from the subsequent set of contextual results based on the one or more identified documents corresponding to a second relationship between the keyword and the data.

* * * * *